(12) United States Patent
Kim et al.

(10) Patent No.: US 8,731,109 B2
(45) Date of Patent: May 20, 2014

(54) METHODS AND SYSTEMS FOR EFFECTIVE CHANNEL ESTIMATION IN OFDM SYSTEMS

(75) Inventors: Je Woo Kim, Cupertino, CA (US); Bok Tae Sim, San Ramon, CA (US); Ju Won Park, San Ramon, CA (US); Tae Ryun Chang, San Clara, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 800 days.

(21) Appl. No.: 12/123,408

(22) Filed: May 19, 2008

(65) Prior Publication Data

US 2009/0285317 A1    Nov. 19, 2009

(51) Int. Cl.
*H04L 25/02* (2006.01)

(52) U.S. Cl.
USPC .......................... 375/316; 375/260

(58) Field of Classification Search
CPC .............. H04L 25/022; H04L 25/0216; H04L 25/0212
USPC ......................... 375/260, 316, 346
See application file for complete search history.

(56) References Cited

U.S. PATENT DOCUMENTS 5,488,633 A *  1/1996 Laroia ........................... 375/262
2005/0157801 A1  7/2005 Gore et al.
2007/0280363 A1 * 12/2007 Im et al. ........................ 375/260
2007/0280366 A1  12/2007 Aytur et al.
2008/0310565 A1 * 12/2008 Abbott et al. ................. 375/348

FOREIGN PATENT DOCUMENTS

| EP | 1816813 A1 | 8/2007 |
| EP | 1968224 A1 | 9/2008 |
| TW | 200601755 | 1/2006 |
| TW | 200713894 | 4/2007 |
| WO | WO2006038828 | 4/2006 |
| WO | WO2007077608 A1 | 7/2007 |

OTHER PUBLICATIONS

Larsson, Erik et al. Joint Symbol Timing and Channel Estimation for OFDM Based WLANs. Aug. 2001, IEEE.*
International Search Report and Written Opinion—PCT/US09/043636, International Searching Authority—European Patent Office, Aug. 18, 2009.
Taiwan Search Report—TW098116597—TIPO—Jun. 8, 2012.

* cited by examiner

*Primary Examiner* — Shuwang Liu
*Assistant Examiner* — David Huang
(74) *Attorney, Agent, or Firm* — Charles Chesney (57) ABSTRACT

A method and apparatus for channel estimation in wireless communications are provided. After an initial channel estimation and an estimation of the effective channel length (ECL) are performed, a weighting based on the ECL may be applied in an effort to remove noise from the initial channel estimate and provide an estimated channel with increased accuracy. Different weightings may apply for different channel lengths. A threshold may be used during the ECL estimation, and the threshold may be predetermined or calculated in an effort to adapt to different channel environments.

22 Claims, 7 Drawing Sheets

METHODS AND SYSTEMS FOR EFFECTIVE CHANNEL ESTIMATION IN OFDM SYSTEMS

TECHNICAL FIELD

Certain embodiments of the present disclosure generally relate to wireless communication and, more particularly, to channel estimation in orthogonal frequency-division multiplexing (OFDM) systems.

BACKGROUND

It is well known that a wireless channel may cause an arbitrary time dispersion, attenuation, and phase shift in the received signal during wireless communications. The use of orthogonal frequency-division multiplexing and a cyclic prefix mitigates the effect of time dispersion. However, it may still be necessary to remove the amplitude and phase shift caused by the channel if one wants to apply linear modulation schemes, such as the ones used in WiMAX (Worldwide Interoperability for Microwave Access), to encode/decode the message.

In an OFDM system, channel estimation generates an estimate of the amplitude and phase shift caused by the wireless channel from the available pilot information. An accurate estimate may be employed to successfully remove the effect of the wireless channel and allow subsequent symbol demodulation.

SUMMARY

Certain embodiments of the present disclosure generally relate to channel estimation of wireless communication channels utilizing a maximum likelihood (ML) weighting based on an effective channel length (ECL) estimation in an effort to reduce the effects of noise and provide a more accurate estimated channel.

Certain embodiments of the present disclosure provide a method for wireless communication. The method generally includes creating an initial channel estimate from a signal received via a wireless channel, estimating an effective channel length (ECL) from the signal, weighting the initial channel estimate based on the ECL to produce a time domain weighted channel impulse response (CIR), and performing a fast Fourier transform (FFT) on the weighted CIR to generate a final estimated channel.

Certain embodiments of the present disclosure provide a receiver for wireless communication. The receiver generally includes initial channel estimation (CE) logic configured to create an initial channel estimate from a signal received by the receiver via a wireless channel, ECL estimation logic configured to estimate an ECL from the received signal, weighting logic configured to weight the initial channel estimate based on the ECL to produce a time domain weighted CIR, and FFT logic configured to perform an FFT on the weighted CIR to generate a final estimated channel.

Certain embodiments of the present disclosure provide an apparatus for wireless communication. The apparatus generally includes means for creating an initial channel estimate from a signal received via a wireless channel, means for estimating an ECL from the signal, means for weighting the initial channel estimate based on the ECL to produce a time domain weighted CIR, and means for performing an FFT on the weighted CIR to generate a final estimated channel.

Certain embodiments of the present disclosure provide a computer-readable medium containing a program for accurately estimating a wireless channel from a received signal, which, when executed by a processor, performs operations. The operations generally include creating an initial channel estimate from the received signal, estimating an ECL from the signal, weighting the initial channel estimate based on the ECL to produce a time domain weighted CIR, and performing an FFT on the weighted CIR to generate a final estimated channel.

Certain embodiments of the present disclosure provide a mobile device. The mobile device generally includes a receiver front end for receiving a signal transmitted via a wireless channel, initial CE logic configured to create an initial channel estimate from the received signal, ECL estimation logic configured to estimate an ECL from the received signal, weighting logic configured to weight the initial channel estimate based on the ECL to produce a time domain weighted CIR, and FFT logic configured to perform an FFT on the weighted CIR to generate a final estimated channel.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Certain embodiments of the present disclosure provide techniques and apparatus for channel estimation in wireless communications. After an initial channel estimation and an estimation of the effective channel length (ECL) are performed, a weighting based on the ECL may be applied in an effort to remove noise from the initial channel estimate and provide an estimated channel with increased accuracy. Different weightings may apply for different channel lengths. A threshold may be used during the ECL estimation, and the threshold may be predetermined or calculated in an effort to adapt to different channel environments.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. Those standards defined at least four different physical layers (PHYs) and one media access control (MAC) layer. The OFDM and OFDMA physical layer of the four physical layers are the most popular in the fixed and mobile BWA areas respectively.

Figure 1:
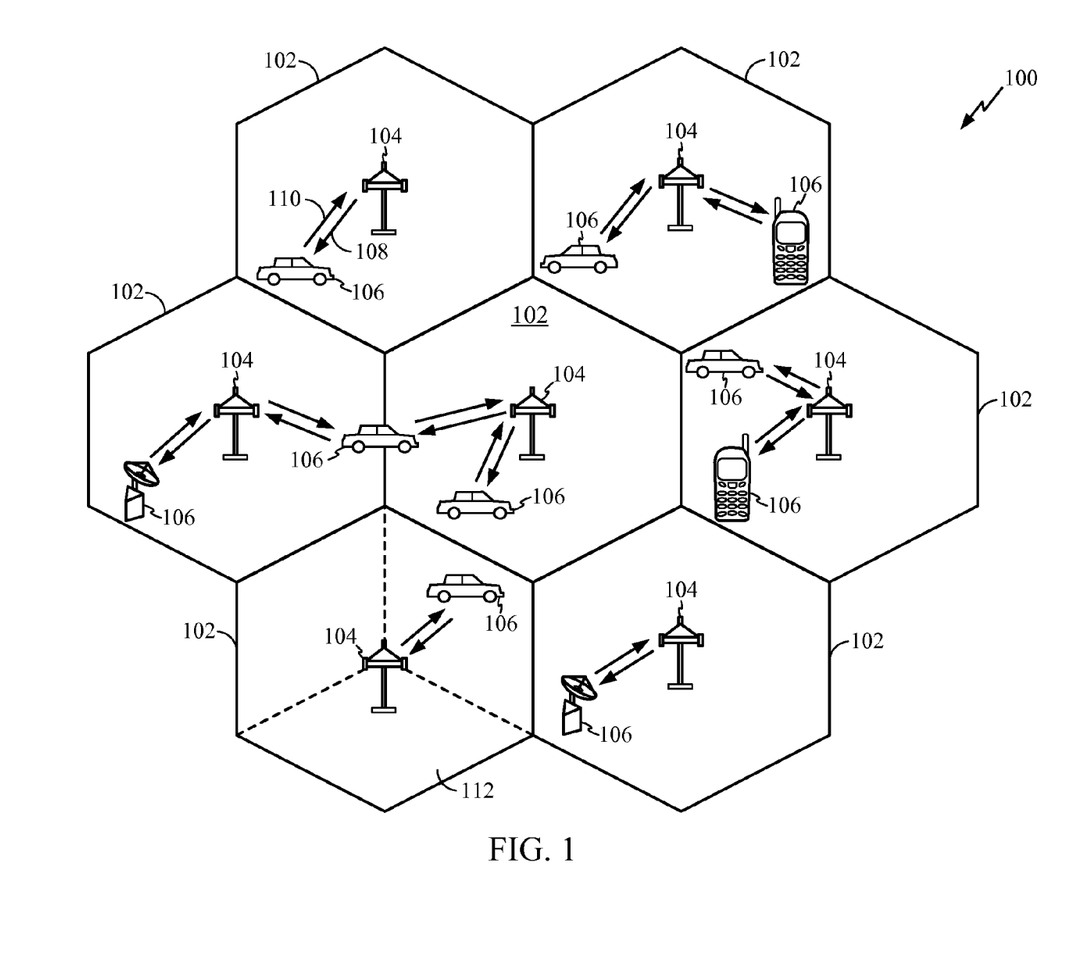
FIG. 1 illustrates an example wireless communication system in accordance with certain embodiments of the present disclosure.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
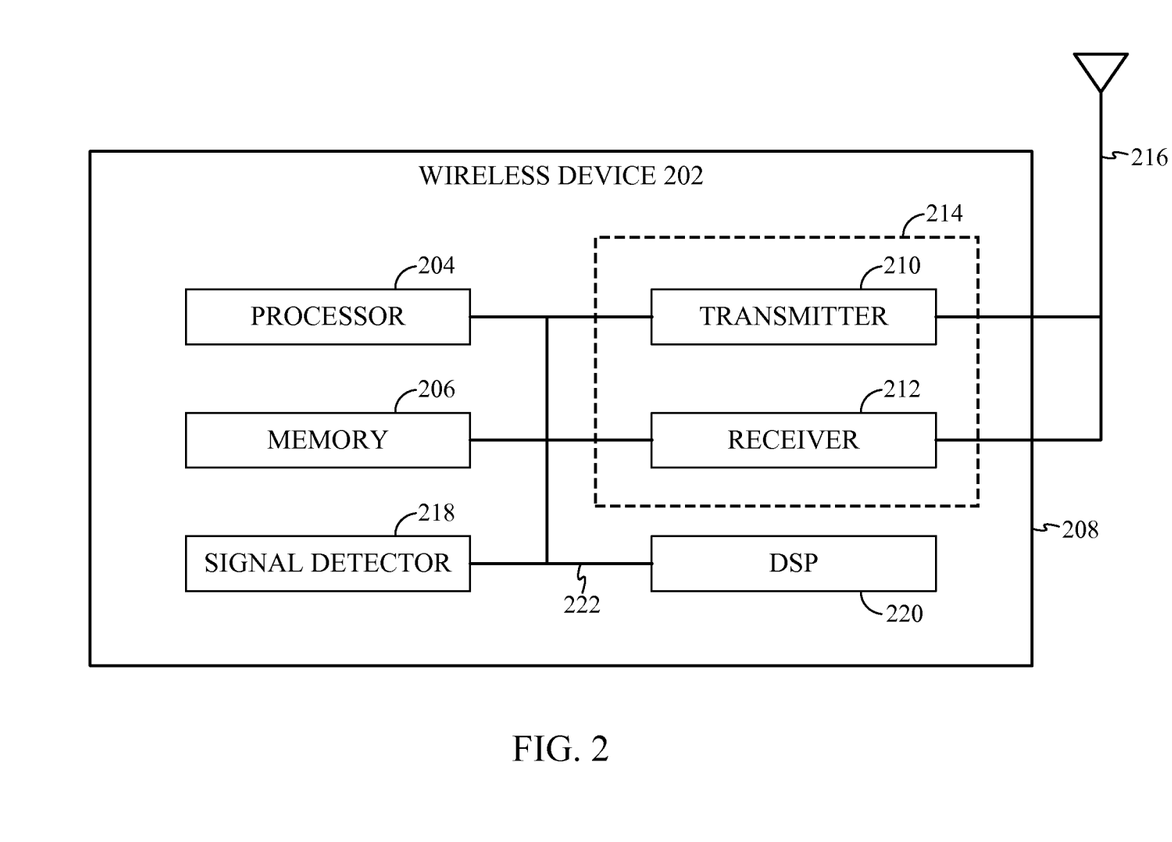
FIG. 2 illustrates various components that may be utilized in a wireless device in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density, and other signals. The wireless device 202 may also include a digital signal processor (DSP) 220 for use in processing signals. The various components of the wireless device 202 may be coupled together by a bus system 222, which may include a power bus, a control signal bus, and a status signal bus in addition to a data bus.

Figure 3:
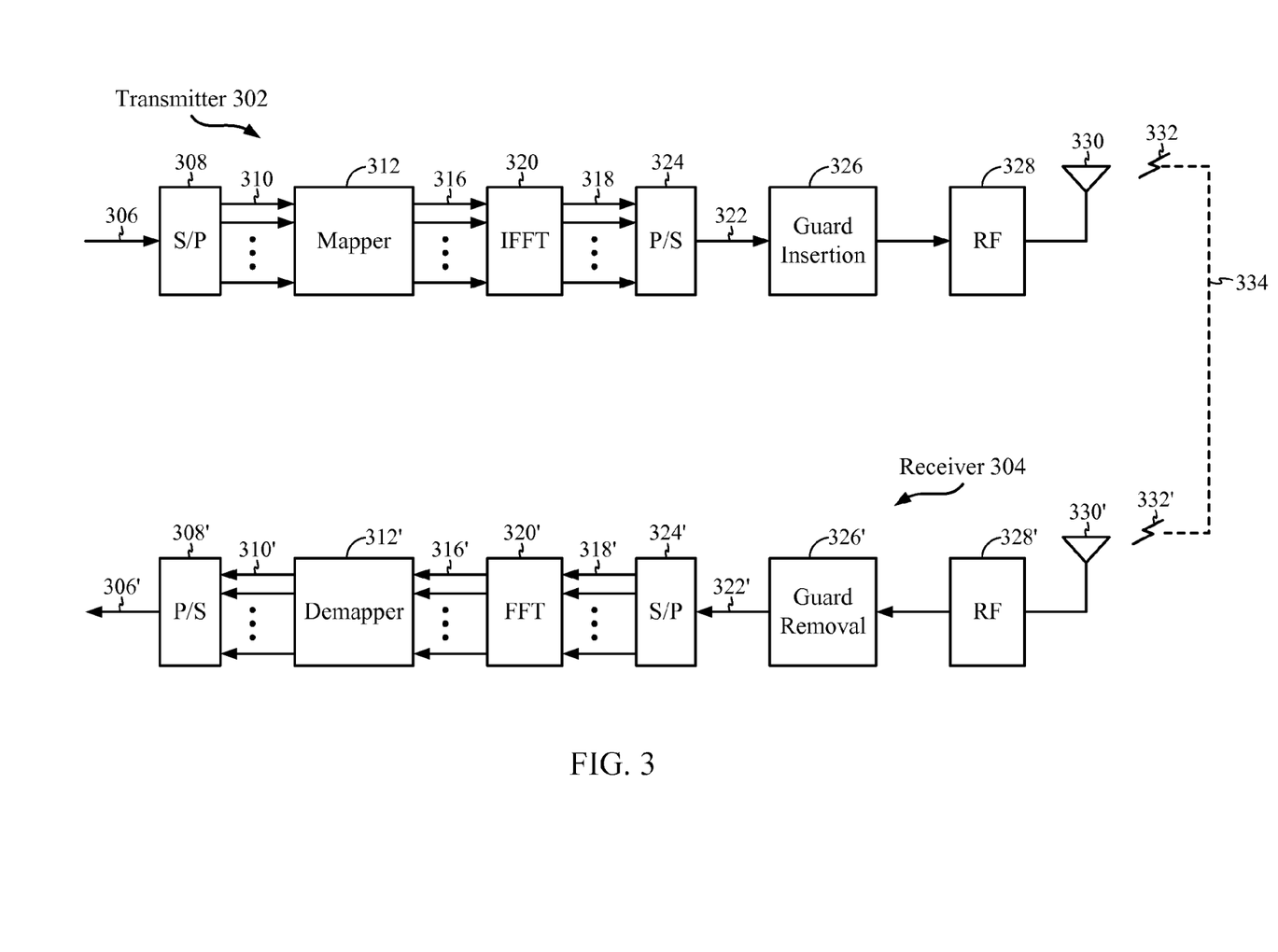
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. Transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal sub-carriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Channel Estimation

Figure 4:
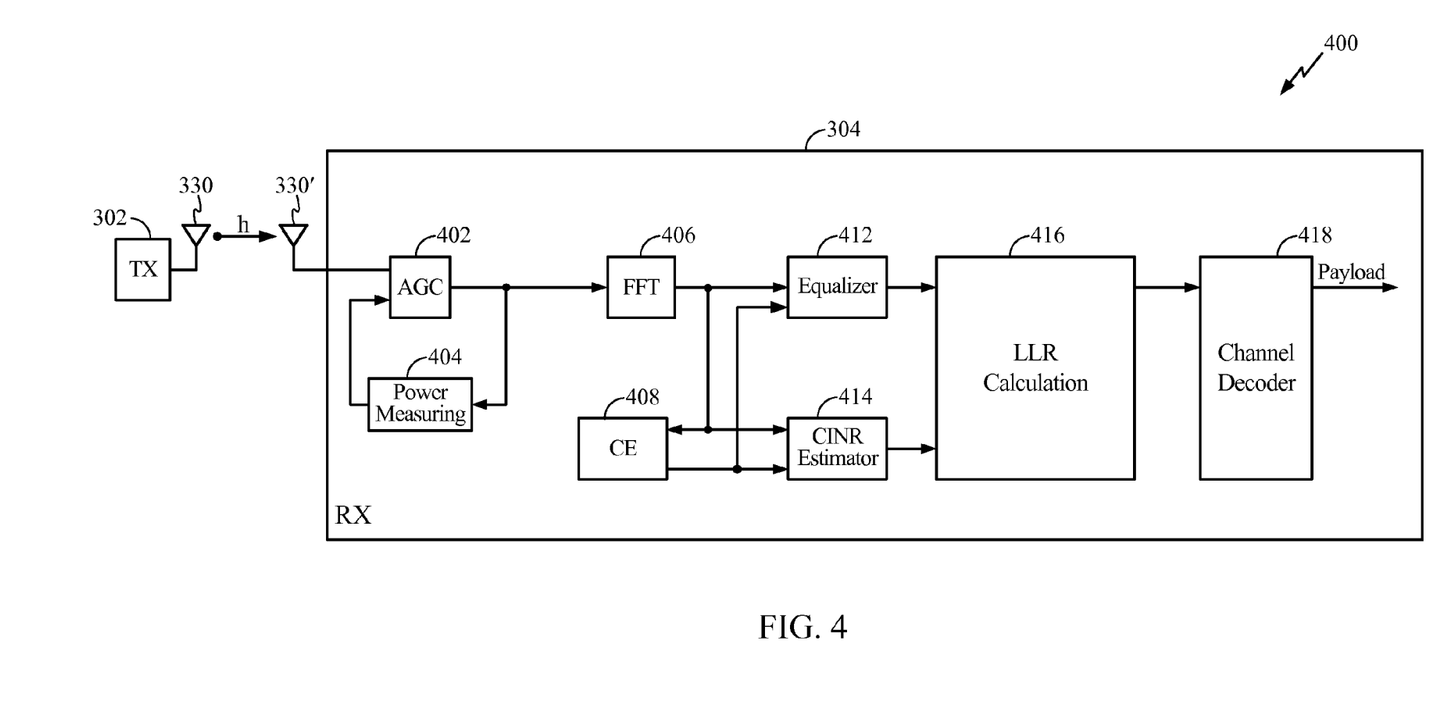
FIG. 4 illustrates an example receiver with signal processing and channel estimation in accordance with certain embodiments of the present disclosure.

Referring now to FIG. 4, a block diagram 400 for a receiver 304 with signal processing and channel estimation is illustrated. The antenna 330' of the receiver 304 may receive a message sent from the antenna 330 of a transmitter 302 across a wireless channel h. The radio frequency (RF) front end of the receiver 304 may include an automatic gain control (AGC) circuit 402 for varying the gain of the received signal such that all signals at the output of the AGC circuit 402 may have the same amplitude. As feedback and control for the AGC circuit 402, the RF front end may contain a power measuring circuit 404 to measure power of the gain-controlled signals from the output of the AGC circuit 402.

The receiver 304 may also include a fast Fourier transform (FFT) block 406 for transforming the gain-controlled received signal from the time domain into the frequency domain. The output of the FFT block 406 may be sent to channel estimation (CE) logic 408, which may estimate the channel for corresponding subcarriers and symbols. The output of the CE logic 408 may be a Fourier transform of the channel h. The output of the FFT block 406 and the output of the CE logic 408 may be sent to an equalizer 412 in an effort to remove the effects of the channel h from the received signal. The output of the FFT block 406 and the output of the CE logic 408 may also be sent to a Carrier-to-Interference-plus-Noise Ratio (CINR) estimator 414. The CINR estimator 414 may estimate the signal power, the interference power, the noise power, and/or the CINR for the received signal and/or the estimated channel.

The equalized signal output from the equalizer 412 and the CINR from the CINR estimator 414 may be input to a log likelihood ratio (LLR) calculation block 416. In the LLR calculation block 416, the LLR is calculated per encoded bit using the equalized signal, the CINR, and the modulation type. For QAM64 modulation, for example, 6 LLRs for 6 encoded bits may be calculated, and 2 LLRs for 2 encoded bits may be calculated for the example of QPSK modulation. The LLRs may be sent from the LLR calculation block 416 to the channel decoder 418, which may decode the demapped bits and output an interpreted message.

Figure 5:
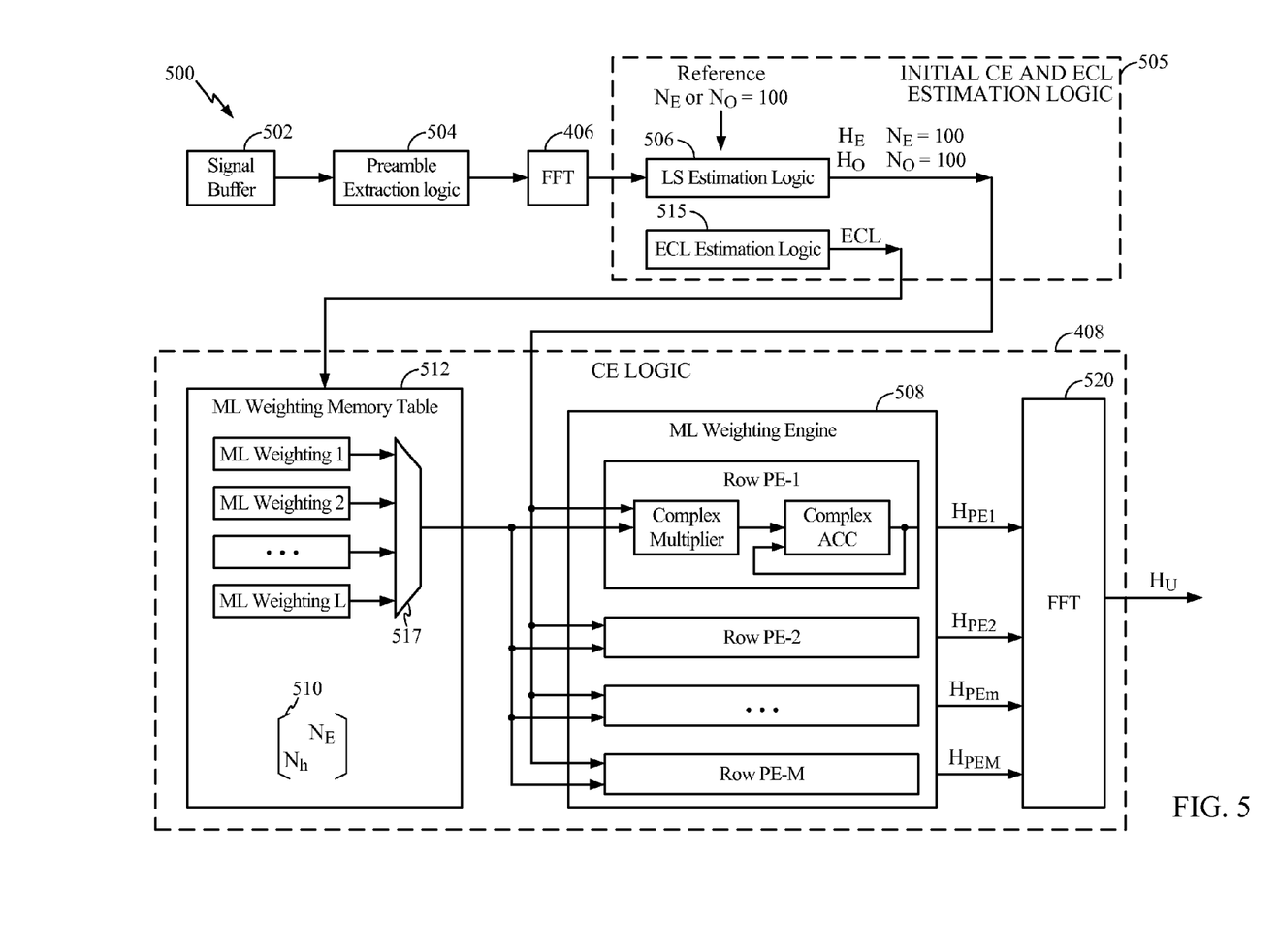
FIG. 5 illustrates a block diagram for channel estimation with increased accuracy using a maximum likelihood (ML) weighting based on an effective channel length (ECL) estimation in an effort to reduce noise in accordance with certain embodiments of the present disclosure.

FIG. 5 depicts a block diagram 500 for receiving a signal and performing channel estimation based on the known preamble according to certain embodiments of the present disclosure. A preamble symbol in an OFDM frame typically consists of equally spaced pilot subcarriers or all pilot subcarriers in a set of used subcarriers. The signal reaching the receiver may pass through an incoming signal buffer 502. The preamble may be extracted from the output of the signal buffer 502 in the preamble extraction logic 504, and the extracted preamble may be input to the FFT block 406 in an effort to transform the preamble from the time domain into the frequency domain.

Initial CE and ECL estimation logic 505 may perform any suitable channel estimation operation, such as least-squares (LS) estimation, in an effort to generate an initial channel estimate from the output of the FFT block 406. In FIG. 5, the LS estimation logic 506 produces the initial channel estimate. In a space-time code (STC) method assuming 200 subcarriers are used, for example, one transmitter may send 100 even-positioned pilots ($N_E$=100) and another transmitter may send 100 odd-positioned pilots ($N_O$=100) to the receiver 304. The initial CE logic 505 may generate separate initial channel estimates for both the even- and odd-positioned pilots.

Also in the initial CE and ECL estimation logic 505, effective channel length (ECL) estimation logic 515 may estimate the effective length of the channel ($N_h$). A rough ECL estimation method may include using the length of the cyclic prefix (CP) for the current connection. A typical OFDM system supports several CP lengths; for example, a WiMAX system supports four different CP lengths: N/4, N/8, N/16, and N/32 where N is FFT size. The CP length may be predetermined for a specific system profile such that a mobile station (MS) can easily determine the CP length by referring to the system profile. In certain systems where the CP length is not predetermined, the CP length may be estimated by the MS during the acquisition process.

Figure 7:
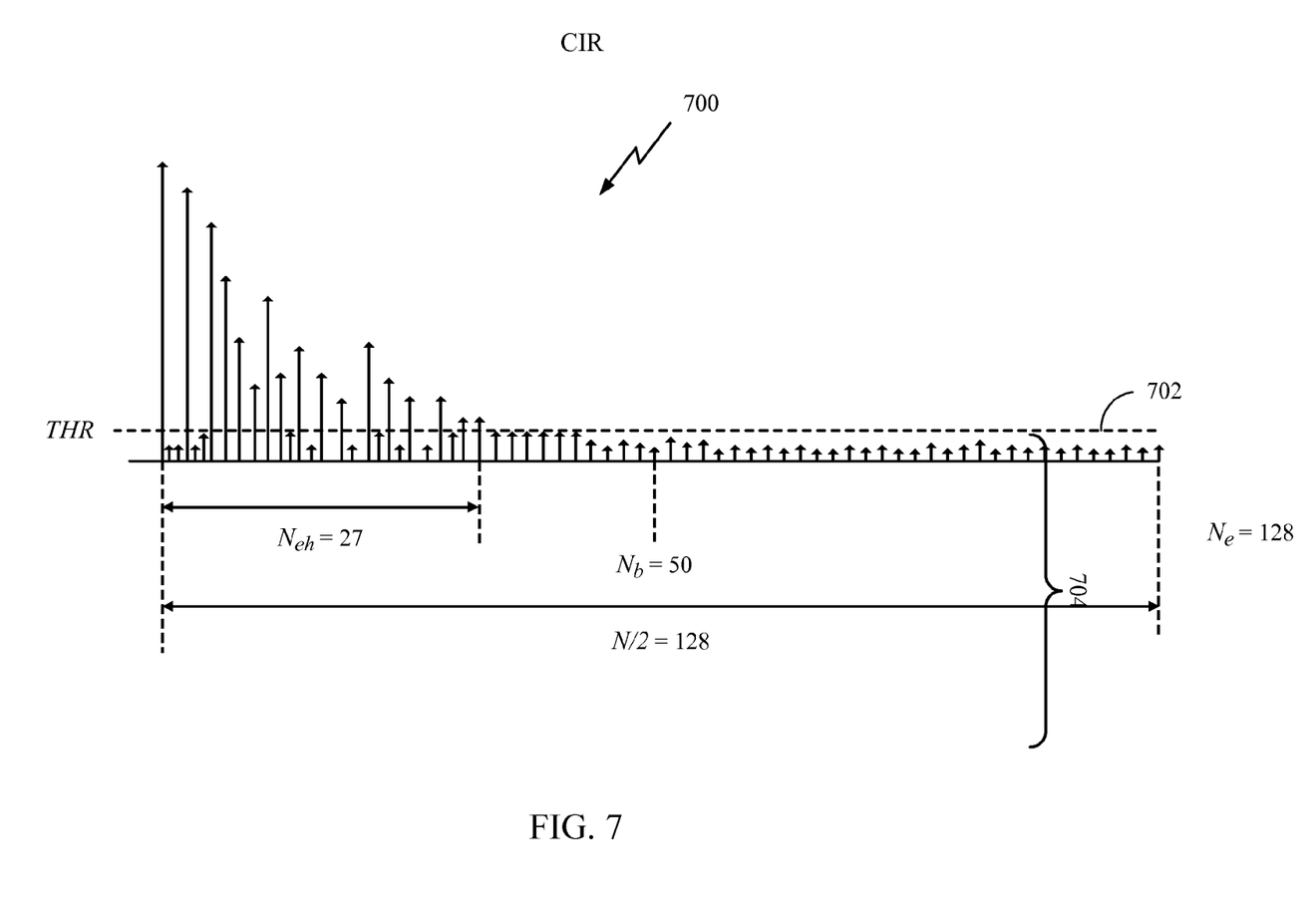
FIG. 7 illustrates determining a threshold from a channel impulse response (CIR) in an effort to estimate the ECL in accordance with certain embodiments of the present disclosure.

For some embodiments, another more accurate method may be used to estimate the ECL, thereby providing better CE performance. This method may include generating a time domain channel impulse response (CIR) that can be obtained by performing the inverse fast Fourier transform (IFFT) on the initial channel estimate ($H_i$) produced by the LS estimation logic 506. In the example of FIG. 5, the number of available $H_i$ samples (i.e., the number of pilots) is 100 ($H_E$ or $H_O$=100). Next, a modified channel estimate ($H_{ih}$) having a size of N/2 (where N is the FFT size) may be generated from $H_i$. N/2 may be selected because it is the nearest power of two greater than the number of $H_i$ samples (100) and less than the FFT size (N=256) in this example. The elements of $H_{ih}$ that do not correspond to the elements of $H_i$ may be set to zero. Then, an N/2-sized IFFT may be performed on the zero-filled modified channel estimate ($H_{ih}$) resulting in the time domain CIR. A typical time domain CIR is shown in FIG. 7 and is described in detail below. The ECL may then be estimated from the time domain CIR.

The initial channel estimate may be processed by the CE logic 408. In an ML weighting engine 508, the initial channel estimate may be weighted with elements of a weighting matrix 510, which may be predetermined and stored in an ML weighting memory table 512. As illustrated in FIG. 5 for even pilots, the dimensions of the weighting matrix 510 may be $N_h \times N_E$, for example, where $N_h$ is the channel length. For odd pilots, the dimensions of another weighting matrix (not shown) may be $N_h \times N_O$.

For some embodiments, weighting values may be calculated for a given estimated ECL generated by the ECL estimation logic 515. For other embodiments, weighting values for different channel lengths may be stored in a lookup table, such as the ML weighting memory table 512 of FIG. 5. The ML weighting memory table 512 may have a number L of different ML weighting matrices. Depending on the estimate of the ECL ($N_{eh}$) provided from the ECL estimation logic 515, a stored weighting matrix 510 from the ML weighting memory table 512 may be selected, rather than calculated.

If the estimated ECL ($N_{eh}$) does not match any of the stored channel lengths ($N_h$), then the weighting matrix corresponding to the nearest $N_h$ may be selected or the weighting matrix corresponding to the nearest $N_h$ that is greater than $N_{eh}$ may be selected. For example, suppose ML Weighting 1 of the ML weighting memory table 512 is a weighting matrix associated with a channel length of 25 ($N_h$=25) and ML Weighting 2 is associated with a channel length of 30 ($N_h$=30). If the estimated ECL is 27 ($N_{eh}$=27), then for embodiments that select the weighting matrix associated with the channel length nearest to the estimated ECL, ML Weighting 1 may most likely be selected. For other embodiments that select the weighting matrix associated with the channel length that is nearest to and greater than the estimated ECL, ML Weighting 2 may most likely be chosen.

One function of the weighting engine 508 may be to perform a pseudo-inverse fast Fourier transform (pseudo-IFFT) or pseudo-inverse discrete Fourier transform (pseudo-IDFT) on the initial channel estimate in an effort to produce a time domain weighted channel impulse response (CIR). The pseudo-IDFT may comprise multiplying the weighting matrix 510 with the conjugate transpose of the weighting matrix 510, taking the inverse of the resulting matrix, and multiplying the inverse matrix with the weighting matrix 510. The result may be multiplied with the initial channel estimate from the initial CE and ECL estimation logic 505 to produce the time domain weighted CIR.

To perform the weighting, the initial channel estimate (i.e., the proposed estimator, or PE) may be processed in the ML weighting engine 508. For some embodiments, the initial channel estimate may be divided into various portions for parallel processing, as shown in FIG. 5, in an effort to speed up the processing in hardware (i.e., reduce the total computation time). The processing for each row in the ML weighting engine 508 may comprise a complex multiplier and a complex accumulator (ACC) for performing the matrix computations in the pseudo-IFFT. The output of the weighting engine 508 for each parallel processing row may be input to an FFT block 520 in an effort to convert the time domain weighted CIR back to the frequency domain.

Therefore, the channel estimation is the cascade of an initial channel estimate (e.g., LS estimate), an effective channel length estimation, a weighting matrix determination, a pseudo-IFFT utilizing the weighting matrix, and an FFT. Hence, the operations involve converting from the frequency domain to the time domain by applying ML weighting to the initially estimated channel and converting back to the frequency domain, thereby producing a final channel estimate (Hu). The final channel estimate (Hu) may be the output of the CE logic 408 to be used by the equalizer 412 and the CINR estimator 414 as illustrated in FIG. 4.

Figure 6:
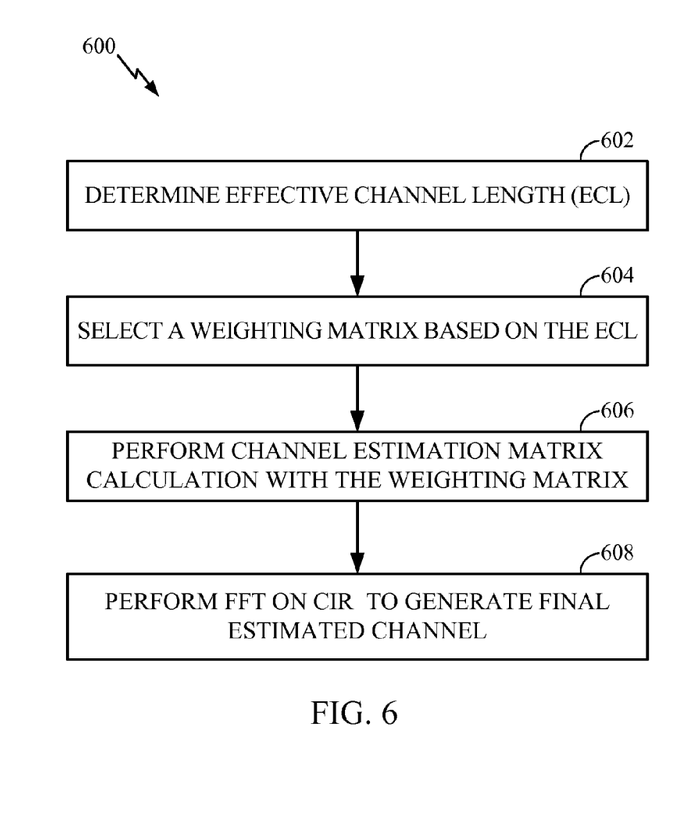
FIG. 6 is a flow chart of example operations for channel estimation using the ML weighting based on the ECL estimation in accordance with certain embodiments of the present disclosure.

FIG. 6 illustrates example operations 600 for performing channel estimation using a threshold value. The operations 600 may begin, at 602, by determining an effective channel length (ECL) estimation. If a time domain CIR is utilized to estimate the ECL as described above, a threshold value may be calculated for some embodiments. The threshold may be based on measurements of the noise components of the time domain CIR, or at least on measurements of components that may be considered as noise. For example, the threshold may equal or be proportional to the average power of a portion of the time domain CIR, the portion being one or more noise-like bands within the time domain CIR. For other embodiments, the threshold value may be a predetermined constant. A calculated threshold may be preferable because such an adaptive threshold can adapt to possibly noisy channel environments.

As an example of an adaptive threshold, the threshold (THR) may be calculated according to the following equation:

$$THR = P_p \times \frac{1}{(N_e - N_b + 1)} \sum_{n=N_b}^{N_e} Pwh_n$$

$$Pwh_n = |wh_n|^2, n=1,2,\ldots,N/2$$

where $P_p$ is the proportionality constant, $N_b$ is the beginning index of the time domain CIR noise-like band, $N_e$ is the end index of the time domain CIR noise-like band, N is the FFT size, and $Pwh_n$ is a measure of the power of the signal for the $n^{th}$ signal. According to this equation, only signals of the time domain CIR whose index is inside the beginning and ending index are used to compute the threshold. Signals outside these points may include effective components of the CIR and/or spectral leakages.

For certain embodiments, $P_p$ may be equal to 1 so that THR is the average power of the noise-like band. If $P_p$ is selected to be significantly less than 1, the resulting THR may allow substantial noise into the final estimated channel, whereas if $P_p$ is chosen to be significantly greater than 1, the THR may undesirably reject lower power effective components. Improperly selecting the proportionality constant may potentially lead to an inaccurate estimated channel.

$N_b$ and $N_e$ may be determined before calculation of THR based on any suitable parameter of the OFDM system, such as the size of the FFT, the channel length, the expected noise of the wireless channel, and experience knowing where the noise-like band will most likely lie. For some embodiments, if $L_p$ is the length of the guard interval in an OFDM system, $N_b$ may be set to $L_p$, and $N_e$ may be set equal to $N/2-L_p$.

Referring now to FIG. 7, a time domain CIR 700 is depicted where the FFT size (N) is 256, for example. The threshold 702 may be calculated according to the average power of the impulses within a noise-like band 704. The region between $N_b$ and $N_e$ is considered to be the noise-like band 704, where the beginning index ($N_b$) was selected to be 50 and the end index ($N_e$) was chosen to be 128 in this example. After the threshold 702 is calculated, the threshold value may be applied to estimate the effective channel length ($N_{eh}$). One way to estimate the ECL using the threshold is to find the rightmost index that is greater than the threshold 702 within a certain window. The window may be the cyclic prefix (CP) length of the current connection or the maximum allowable CP length. The length of the estimated effective channel equals 27 in this example since this is the rightmost index that is greater than the threshold (THR) 702.

At 604, a weighting matrix may be determined based on the ECL by any suitable means, such as by selecting the weighting matrix from a lookup table. The weighting matrix may be an ML weighting matrix as described above. The weighting matrix may be predetermined and stored in memory or any other suitable type of computer-readable medium. For other embodiments, the weighting matrix may be calculated based on the ECL.

At 606, channel estimation matrix calculation (e.g., a pseudo-IFFT) may be performed on the initial channel estimate using the weighting matrix determined at 604. After the weighting has been applied at 606, an FFT may be performed on the time domain CIR with the noise components removed in an effort to generate the final estimated channel in the frequency domain at 608. By properly applying the weighting to the time domain CIR to remove noise components, the final estimated channel ($H_U$) may be more accurate when compared to conventional channel estimations, thereby leading to more accurate removal of the effects of the channel for successful symbol demodulation in OFDM systems.

Figure 6A:
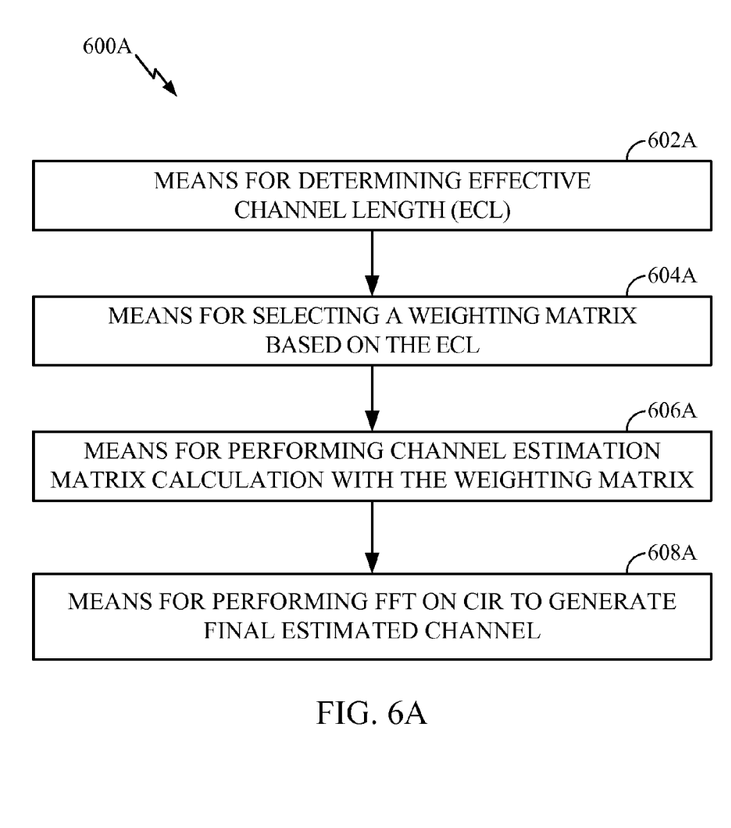
FIG. 6A is a block diagram of means corresponding to the example operations for channel estimation of FIG. 6 in accordance with certain embodiments of the present disclosure.

The operations 600 of FIG. 6 described above may be performed by various hardware and/or software component(s) and/or module(s) corresponding to the means-plus-function blocks 600A illustrated in FIG. 6A. In other words, blocks 602 through 608 illustrated in FIG. 6 correspond to means-plus-function blocks 602A through 608A illustrated in FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as instructions, or one or more sets instructions on a computer-readable medium or storage medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method comprising:
    creating an initial channel estimate from a signal received via a wireless channel;
    estimating an effective channel length (ECL) from the signal;
    weighting the initial channel estimate by applying a pseudo-inverse fast Fourier transform (pseudo-IFFT) to the initial channel estimate using a weighting matrix calculated based on the ECL to produce a time domain weighted channel impulse response (CIR) with removed noise components,
    wherein weighting the initial channel estimate comprises accessing a weighting table having a plurality of weighting matrices and selecting the weighting matrix from the plurality of weighting matrices based on the estimated ECL of the wireless channel, and weighting the initial channel estimate using the selected weighting matrix, and wherein the selecting of the weighting matrix further comprises selecting the weighting matrix associated with a channel length nearest to the estimated ECL when the estimated ECL does not match any of the channel lengths associated with each of the weighting matrices stored in the weighting table; and
    performing a fast Fourier transform (FFT) on the weighted CIR to generate a final estimated channel.

2. The method of claim 1, wherein determining the weighting matrix comprises calculating the weighting matrix based on the ECL.

3. The method of claim 1, wherein estimating the ECL comprises:
    generating an initial time domain channel impulse response (CIR) from the initial channel estimate;
    determining a threshold value for the initial time domain CIR; and
    selecting an index of the initial time domain CIR above the threshold value to be the ECL.

4. The method of claim 3, wherein determining the threshold value comprises calculating an average power of a noise-like band in the initial time domain CIR.

5. The method of claim 1, wherein the creating of the initial channel estimate comprises least-squares (LS) estimation.

6. A receiver for wireless communication, comprising:
    initial channel estimation (CE) logic configured to create an initial channel estimate from a signal received by the receiver via a wireless channel;
    effective channel length (ECL) estimation logic configured to estimate an ECL from the received signal;
    weighting logic configured to weight the initial channel estimate by applying a pseudo-inverse fast Fourier transform (pseudo-IFFT) to the initial channel estimate using a weighting matrix calculated based on the ECL to produce a time domain weighted channel impulse response (CIR) with removed noise components,
    wherein the weighting logic is further configured to access a lookup table having a plurality of weighting matrices, select a predetermined weighting matrix from the plurality of weighting matrices based on the estimated ECL of the wireless channel, and weight the initial channel estimate using the selected weighting matrix, and wherein the weighting logic is further configured to select the weighting matrix associated with a channel length nearest to the estimated ECL when the estimated ECL does not match any of the channel lengths associated with each of the weighting matrices stored in the weighting table; and
    fast Fourier transform (FFT) logic configured to perform an FFT on the weighted CIR to generate a final estimated channel.

7. The receiver of claim 6, wherein the estimation logic is configured to generate an initial time domain channel impulse response (CIR) from the initial channel estimate, determine a threshold value for the initial time domain CIR, and select an index of the initial time domain CIR above the threshold value to be the ECL.

8. The receiver of claim 7, wherein the estimation logic is configured to determine the threshold value by calculating an average power of a noise-like band in the initial time domain CIR.

9. An apparatus for wireless communication, comprising:
    means for creating an initial channel estimate from a signal received via a wireless channel;
    means for estimating an effective channel length (ECL) from the signal;
    means for weighting the initial channel estimate by applying a pseudo-inverse fast Fourier transform (pseudo-IFFT) to the initial channel estimate using a weighting matrix calculated based on the ECL to produce a time domain weighted channel impulse response (CIR) with removed noise components,
    wherein the means for weighting the initial channel estimate is configured to access a lookup table having a plurality of weighting matrices, select a predetermined weighting matrix from the plurality of weighting matrices based on the estimated ECL of the wireless channel, and weight the initial channel estimate using the selected weighting matrix, and wherein means for selecting the weighting matrix is configured to select the weighting matrix associated with a channel length nearest to the estimated ECL when the estimated ECL does not match any of the channel lengths associated with each of the weighting matrices stored in the weighting table; and means for performing a fast Fourier transform (FFT) on the weighted CIR to generate a final estimated channel.

10. The apparatus of claim 9, wherein the means for estimating the ECL is configured to generate an initial time domain channel impulse response (CIR) from the initial channel estimate, determine a threshold value for the initial time domain CIR, and select an index of the initial time domain CIR above the threshold value to be the ECL.

11. The apparatus of claim 10, wherein the means for estimating the ECL is configured to calculate the threshold value by calculating an average power of a noise-like band in the initial time domain CIR.

12. The apparatus of claim 9, wherein the means for creating an initial channel estimate comprises least-squares (LS) estimation logic.

13. The apparatus of claim 9, wherein the means for estimating the ECL comprises:
means for generating an initial time domain channel impulse response (CIR) from the initial channel estimate;
means for determining a threshold value for the initial time domain CIR; and
means for selecting an index of the initial time domain CIR above the threshold value to be the ECL.

14. The apparatus of claim 13, wherein the means for determining the threshold value comprises means for calculating an average power of a noise-like band in the initial time domain CIR.

15. A non-transitory computer-readable medium containing a program for accurately estimating a wireless channel from a received signal, which, when executed by a processor, performs operations comprising:
creating an initial channel estimate from the received signal;
estimating an effective channel length (ECL) from the signal;
weighting the initial channel estimate by applying a pseudo-inverse fast Fourier transform (pseudo-IFFT) to the initial channel estimate using a weighting matrix calculated based on the ECL to produce a time domain weighted channel impulse response (CIR) with removed noise component,
wherein weighting the initial channel estimate comprises accessing a weighting table having a plurality of weighting matrices and selecting the weighting matrix from the plurality of weighting matrices based on the estimated ECL of the wireless channel, and weighting the initial channel estimate using the selected weighting matrix, and wherein the computer-readable medium configured to perform the selecting of the weighting matrix is further configured to select the weighting matrix associated with a channel length nearest to the estimated ECL when the estimated ECL does not match any of the channel lengths associated with each of the weighting matrices stored in the weighting table; and
performing a fast Fourier transform (FFT) on the weighted CIR to generate a final estimated channel.

16. The computer-readable medium of claim 15, wherein estimating the ECL comprises:
generating an initial time domain channel impulse response (CIR) from the initial channel estimate;
determining a threshold value for the initial time domain CIR; and
selecting an index of the initial time domain CIR above the threshold value to be the ECL.

17. The computer-readable medium of claim 16, wherein determining the threshold value comprises calculating an average power of a noise-like band in the initial time domain CIR.

18. The computer-readable medium of claim 15, wherein creating the initial channel estimate uses least-squares (LS) estimation.

19. A mobile device, comprising:
a receiver front end for receiving a signal transmitted via a wireless channel;
initial channel estimation (CE) logic configured to create an initial channel estimate from the received signal;
effective channel length (ECL) estimation logic configured to estimate an ECL from the received signal;
weighting logic configured to weight the initial channel estimate by applying a pseudo-inverse fast Fourier transform (pseudo-IFFT) to the initial channel estimate using a weighting matrix selected based on the ECL to produce a time domain weighted channel impulse response (CIR) with removed noise components,
wherein the weighting logic is further configured to access a lookup table having a plurality of weighting matrices, select a predetermined weighting matrix from the plurality of weighting matrices based on the estimated ECL of the wireless channel, and weight the initial channel estimate using the selected weighting matrix, and wherein the weighting logic is further configured to select the weighting matrix associated with a channel length nearest to the estimated ECL when the estimated ECL does not match any of the channel lengths associated with each of the weighting matrices stored in the weighting table; and
fast Fourier transform (FFT) logic configured to perform an FFT on the weighted CIR to generate a final estimated channel.

20. The mobile device of claim 19, wherein the ECL estimation logic is further configured to:
generate an initial time domain channel impulse response (CIR) from the initial channel estimate;
determine a threshold value for the initial time domain CIR; and
select an index of the initial time domain CIR above the threshold value to be the ECL.

21. The mobile device of claim 20, wherein to determine the threshold value, the ECL estimation logic is further configured to calculate an average power of a noise-like band in the initial time domain CIR.

22. The mobile device of claim 19, wherein the CE logic comprises least-squares (LS) estimation logic.

* * * * *